April 5, 1966     E. E. KÜHNER     3,244,411
CONCRETE PREPARATION PLANT
Filed Sept. 24, 1963     2 Sheets-Sheet 1

INVENTOR.
ERNST EWALD KÜHNER
BY Hamilton & Cook
ATTORNEYS

April 5, 1966  E. E. KÜHNER  3,244,411
CONCRETE PREPARATION PLANT
Filed Sept. 24, 1963  2 Sheets-Sheet 2

INVENTOR.
ERNST EWALD KÜHNER
BY
ATTORNEYS

United States Patent Office 3,244,411
Patented Apr. 5, 1966

3,244,411
CONCRETE PREPARATION PLANT
Ernst Ewald Kühner, Kreuzstrasse 1, Bruchhausen, near
Karlsruhe, Germany
Filed Sept. 24, 1963, Ser. No. 311,078
Claims priority, application Germany, Sept. 25, 1962,
K 47,810
1 Claim. (Cl. 259—165)

The invention concerns a concrete preparation plant with a device for feeding the aggregates from an aggregate stockpile, said stockpile consisting of sectoral boxes which are separated from each other by radial partition walls and are arranged about a common input device and separated from said input device by means of an end wall which has a feed opening for every box, a mixing device, if necessary with a storage hopper, batching devices for aggregates, cementing material and water, as well as a hoist with a skip for the aggregates.

It has often been found advantageous to erect a concrete preparation plant on a centrally located site, in order to supply small and medium sized building sites, and to transport the concrete to the points of consumption in vehicles, since there are no complete plants on the market which can be erected in the space which is often very limited on such building sites and without laborious erecting operations.

Employing modern controlling and governing devices, it is possible to operate with a minimum of personnel the plants mentioned hereinbefore and combined to a single stationary unit. A further improvement was the designing of fully automatic concrete preparation plants, equipped with programming devices, which permit of a quick change of the composition and the quality of the concrete. These stationary plants, having a high output for the most part, have the disadvantage that they can not follow the crucial point of building operations, and for this reason they are insufficiently utilized, with the result that they operate uneconomically, and in addition the traffic situation, together with the limited traveling time of fresh or ready mixed concrete, increase the difficulty of the situation. On the other hand, the use of truck mixers demands high capital investment.

According to a suggestion of the applicant, previously filed and not yet known, for the purpose of eliminating these disadvantages, concrete preparation plants with all their accompanying devices, namely input device with feed openings in the end wall for each box of an aggregate stockpile, hoist with skip for aggregates, batching devices for aggregates, cementing material and water, conveying and feeding devices for cementing material and water, mixing device if necessary with storage hopper for the fresh or ready mixed concrete, as well as the controlling and governing devices shall be united in a common machine frame to a closed transportable unit. Such a plant requires only a small surface area and after transportation to the building site or to the point of erection it merely requires the setting up of the aggregate stockpile and it is immediately ready for operating, thus being particularly suitable for small and medium sized building sites, but it has the disadvantage that it cannot be transported in the operating position.

Therefore, it seems imperative that concrete preparation plants be produced which allow of a quick change of location and which have outside dimensions which are within the regulation height, width and length prescribed for transportation on public roads, so that special permissions will not have to be procured for every transport. Particularly, the prescribed limit for the height of such a plant causes trouble, since for the fresh or ready mixed concrete often such a discharge height is required, which makes it impossible to transport the plant in the operating position on roads. A further consideration is that the means of transporting the ready mixed concrete often differ from site to site, depending on the character of the point of application, with the result that different discharge heights are required, which up to now were managed by means of provisional arrangements, wooden or steel frameworks, foundations and so on. It is therefore above all necessary to strive after a mobile plant which is so designed that the discharge of the fresh or ready mixed concrete can not only be directly into road trucks but also at other lower discharge heights.

The overall height required to allow larger transportation means move in under the discharge opening could be combined with the extreme dimensions to be observed for the transportation of the entire plant only if the plant were transported in a lying position. However, this proves to be dangerous, inasfar as the concrete preparation plant is not expressly constructed for transportation in this position. There is the danger of causing damage, e.g. the loss of gear oil, leading to breakdowns when the plant is in operation later. On the other hand, the arranging of such plants for transportation in a lying position necessitates considerable additional expenditure, which is not justifiable as it is only to be applied in those cases where the location is changed.

The invention, therefore, is based on the problem of producing a concrete preparation plant with which can be achieved the greatest possible discharge height for the fresh or ready mixed concrete, meaning sufficient for all modes of transport, and at the same time the lowest possible arrangement for the aggregate passages in the operating position even without excavating a pit, yet not exceeding the permissible outside dimensions, particularly the height, when transporting in an erect position.

A mobile or transportable plant, according to the invention, for producing concrete by mixing cement, water and aggregates has upper and lower parts arranged one above the other. The two parts are vertically adjustable and are stabilized and fixed in an adjusted height by means such as a series of vertical supports movable within guides attached to the base frame of the lower part and to the top part. It is preferred to provide the supports with a series of spaced apart holes arranged vertically one above the other and extending transversely to the longitudinal axis of the support to receive positioning bolts inserted through corresponding holes in the guides. Alternatively, the relative height of the two parts could be fixed by means of elements for clamping the guides on the supports.

The mobile plant is supplied with aggregates from a stockpile stored in a plurality of sectoral boxes arranged on the rear side of the plant. The sectoral boxes are formed or defined by means of radial partition walls. Stirrups with U-profiles can be provided on the base frame of the lower part and on the top part for anchoring the partition walls with fastening bolts. It is preferred to provide the upper portion of each partition wall with a series of spaced apart holes arranged one above the other, at the same distance as the holes in the plant supports, to receive the fastening bolt.

The aggregate stockpile within the sectoral boxes is separated from the upper and lower parts by a common wall or panel. The common wall may be secured to the base frame of the lower part while being freely movable against the upper part so as to span the variable distance between the two parts, depending upon the adjusted height.

The common wall separating the upper and lower parts from the aggregate stockpile has a feed opening therethrough for each sectoral box. On the base frame of the lower part are passages one for each feed opening. Each passage is closed by a door at the discharge end. When the doors are opened, aggregates from the stockpile are delivered into a common receiver or input device.

The common receiver, a weighing device for the aggregate and the bottom portion of the conveying device or hoist for the aggregates can be located inside the base frame of the lower part. The upper part of the plant holds the concrete mixing device, the upper portion of the hoist with a hoist winch, and the measuring devices for cement and water. Furthermore, a scraper and drive unit for feeding aggregates to the stockpile can be fitted to the upper part of the plant.

All conveying devices extending between the upper and lower parts of the plant, particularly the hoistway for the aggregates, are designed to be variable in length so as to span the variable distance between two parts, depending upon the adjusted height. For the hoistway, intermediate rails of appropriate length can be inserted to serve as guide ways for the skip hoist. If the cement is supplied to the mixing device by a screw conveyor running from the bottom up to the top, the resulting differnces in height can be compensated for by means of a corresponding inclination of the screw conveyor in the sloping position, or if the screw conveyor is rigidly built in, its length can be adjusted by means of intermediate sections.

Further features of the invention include suspending the bottom ends of the guideways or rails of the hoistway as a part of the aggregate weigher for indicating the weight of aggregates delivered to the skip hoist.

For lifting the upper part of the plant and, if necessary, the bottom part, the outer side of the guides may be fitted with shelf brackets on which lifting jacks can be set. If desired, mechanical, hydraulic or pneumatic lifting gear could also be rigidly attached to the plant.

To make the plant according to the invention mobile, the base frame of the lower part can be fashioned as a running gear, or a special undercarriage can be planned to run in under the base frame.

Further details and advantages of the object of the invention will become apparent from the following description of the attached drawings, which represent, by way of example, a preferred form concrete preparation plant according to the invention.

Figure 1:
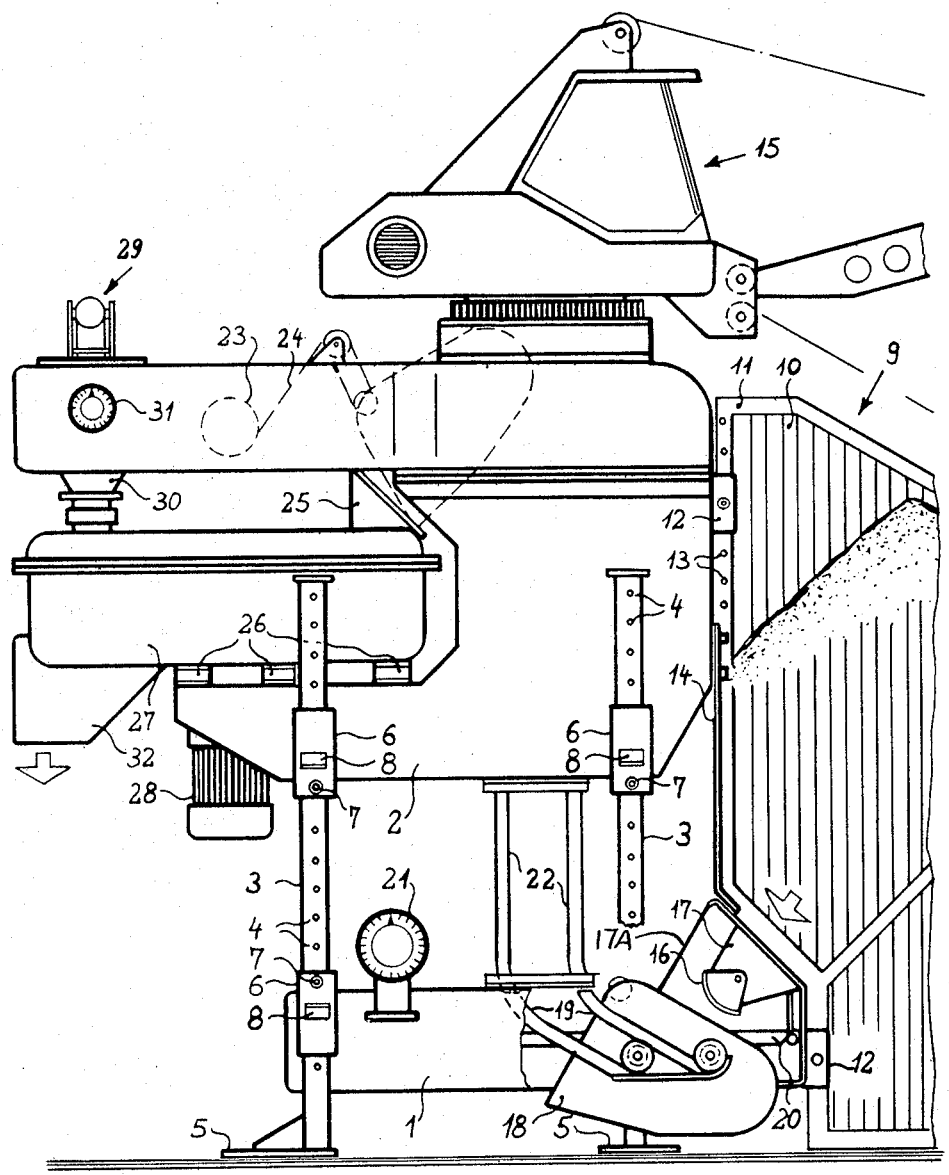
FIGURE 1 is a side elevation of the entire plant with the casing partly broken away for the purpose of showing the inner parts.
Figure 2:
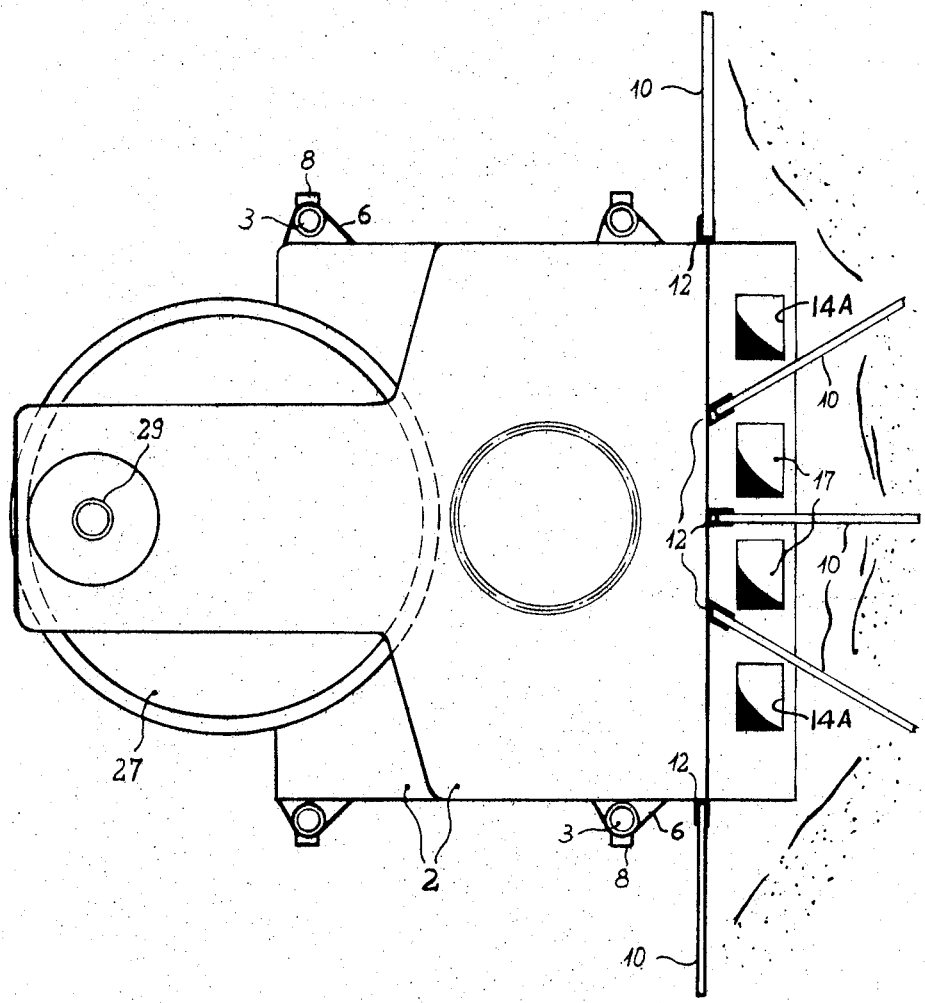
FIGURE 2 is a top plan view of the plant shown in FIGURE 1.

The basic structure of the concrete preparation plant consists of the lower part and base frame 1 and the upper or top part 2. Both parts are connected by tubular steel supports 3, which each have a series of holes 4 arranged vertically at equal distances one above the other and extending transversely to the longitudinal axis of the supports; said supports are fitted with standing brackets 5 at the bottom. For every support 3 there is arranged a guide 6 on the bottom edge of the top part 2 as well as at the base frame 1, which guide encloses the support 3 with a sliding fit and is capable of being fixed in relation to the support 3 by means of a bolt 7. With the aid of bolt 7, the base frame 1 as well as the top part 2 can be secured in the required height. Brackets 8, on which lifting means can be set, are welded to the guides 6 for lifting one or both parts.

To the rear side of the concrete preparation plant is connected the batter stockpile 9 for different aggregates, which are separated from each other to provide sectoral boxes by means of partition walls 10. The partition walls 10, consisting of frames 11 enclosing corrugated panels, are arranged radially and are anchored to the base frame 1 and the top part 2 by means of U-shaped stirrups 12 into which bolts can be transversely inserted. Series of holes 13 are provided in those parts of the frame 11 which rest against the top part 2; the distances between these holes are the same as the distances between the holes 4 in the supports 3.

The distance between frame 1 and top part 2 on the side towards the batter stockpile is spanned by an interchangeable wall panel 14 stretching across the entire width of the plant. The common wall 14 has a feed opening 14A therethrough one for each sectoral box. A scraper 15, only the drive unit with draw gear and operator's cab of which are shown, located on the top part 2, serves for piling up the aggregate stockpile 9 for gravity flow into the feed openings 14A.

A passage 17 is provided for each of the feed openings in the common wall 14. Each passage 17 has a downwardly inclined surface on the rear side of the lower part or base frame 1 and is fitted at the discharge end with a door 16. When the doors 16 are selectively opened by suitable means (not shown); the aggregates flow through these passages into a common receiver or input device 17A and then into a hoist skip 18 which travels in guide rails 19 and which is located in its bottom end position under the common receiver 17A. In this position, the hoist skip 18 with its guide rails 19 is suspended in an aggregate weigher 20, the indication device 21 of which is arranged outside the machine stand in a position where it is clearly visible. Differently long intermediate sections 22, according to the distance, can be inserted to span the distance between the guide rails 19 and the part of the hoistway rigidly arranged in the top part 2.

In the top part 2 of the machine stand there is a hoist winch 23, which effects the transport of the hoist skip 18 by means of a traction cable 24. By means of a suitable bend of that part of the hoistway—not shown in the drawing—located in the top part, the hoist skip 18 is so inclined in its top end position that it can empty its contents into the feeder 25 of a rotary mixer 27 resting on backets 26 in the top part 2 of the plant. The mixer is driven by an electric motor 28.

In the embodiment shown, a cement inlet 29 rotatable around a vertical axis, the connecting piece of which can be rotated in a swivel bracket around a horizontal axis, is provided for delivering the cement into the mixer 27. This cement inlet is connected to a cement screw conveyor of known make. A cement weigher 30 with indicating device 31 is arranged below the cement inlet 29. A further batching device for water (not shown) can likewise be suitably arranged in the top part 2.

The ready mixed batch is discharged through the discharge funnel 32 into the transport means, and the top part 2 is adjusted to the receiving height of said means. A storage hopper can be arranged below the discharge funnel, making the continuous operation of the concrete preparation plant largely independent of the transport frequency.

When the concrete preparation plant is being transported, the top part 2 rests directly on the base frame 1, or the two parts have been brought together, by a corresponding choice of holes 4 in the supports 3, so that the total height permissible for transportation on public roads is not exceeded. At the site of operations, the base frame 1 and the top part 2 are lifted with lifting gear to the required height and secured by means of bolts 7.

The base frame 1 can be designed as the rear part of a running gear and provided with wheels, and the front part of the running gear, preferably drawn up in the shape of a bridge, can be dismantled and can have either a pivoted bogie or a steering axle for the front wheels.

What is claimed is:

In a mobile plant for producing concrete by mixing cement, water and aggregates, said plant having vertically adjustable upper and lower parts arranged one above the other, and means for stabilizing and fixing the adjusted height of said upper and lower parts, said plant being supplied from a stockpile of aggregates stored in a plurality of sectoral boxes defined by partition walls extending radially from said upper and lower parts, said stockpile being separated from said upper and lower parts by a wall, said wall having a feed opening therethrough one for each sectoral box, the improvement comprising, said wall separating said upper and lower parts from said stockpile of aggregates being secured to said lower part and freely movable against said upper part, a passage within said lower part one for each feed opening, a door at the discharge end of each said passage, a common receiver for aggregates delivered within said lower part by selective opening of said doors, a hoistway extending between said upper and lower parts with a bottom end under said common receiver, a skip hoist movable in said hoistway, an aggregate weigher suspending the bottom end of said hoistway, said weigher indicating the weight of aggregates delivered to said skip hoist when under said common receiver and said doors are selectively opened, a mixer for cement, water and aggregates in said upper part, means at the upper end of said hoistway to empty the aggregate contents of said skip hoist into said mixer, means for delivering cement and water into said mixer, and a funnel beneath said mixer for delivering concrete to a transport means, said delivery point being above said lower part of the mobile plant.

References Cited by the Examiner

UNITED STATES PATENTS

| | | | |
|---|---|---|---|
| 1,775,746 | 9/1930 | Yett | 259—154 |
| 3,116,051 | 12/1963 | Preeman | 259—153 |

FOREIGN PATENTS

| | | |
|---|---|---|
| 1,292,163 | 3/1964 | France. |
| 853,443 | 11/1960 | Great Briain. |

WALTER A. SCHEEL, *Primary Examiner.*

CHARLES A. WILLMUTH, *Examiner.*